United States Patent
Gokan et al.

(12) 
(10) Patent No.: US 6,346,020 B1
(45) Date of Patent: Feb. 12, 2002

(54) SMALL-SIZED BOAT

(75) Inventors: Yoshitsugu Gokan; Akira Tokito, both of Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/714,484

(22) Filed: Nov. 17, 2000

(30) Foreign Application Priority Data

Nov. 19, 1999 (JP) ............................................. 11-329462

(51) Int. Cl.⁷ ............................................... B63H 21/32
(52) U.S. Cl. ........................................... 440/89; 60/223
(58) Field of Search ....................... 440/88, 89; 60/313, 60/323

(56) References Cited

U.S. PATENT DOCUMENTS 5,822,986 A * 10/1998 Higashide .................... 60/313

FOREIGN PATENT DOCUMENTS

JP          2880680        11/1999

* cited by examiner

*Primary Examiner*—Jesus D. Sotelo
(74) *Attorney, Agent, or Firm*—Birch, Stewart, Kolasch & Birch, LLP.

(57) ABSTRACT

To miniaturize an exhaust manifold to facilitate disposition of an engine in a boat body. A multiple cylinder engine having an exhaust manifold on a side portion thereof is disposed such that a crankshaft thereof extends along forward and rearward directions of a boat body. The exhaust manifold has a structure wherein exhaust pipes connected to exhaust ports of the engine are distributed upwardly and downwardly in such a manner as to form confluence pipes above and below the exhaust ports and the confluence pipes are further joined to each other to form an exhaust gas exit from the exhaust manifold. The exhaust gas exit is disposed at a substantially central portion of an internal space of the boat body in the vertical direction and an exhaust gas turbo charger is connected to the exhaust gas exit.

16 Claims, 11 Drawing Sheets

FIG. 7(III)
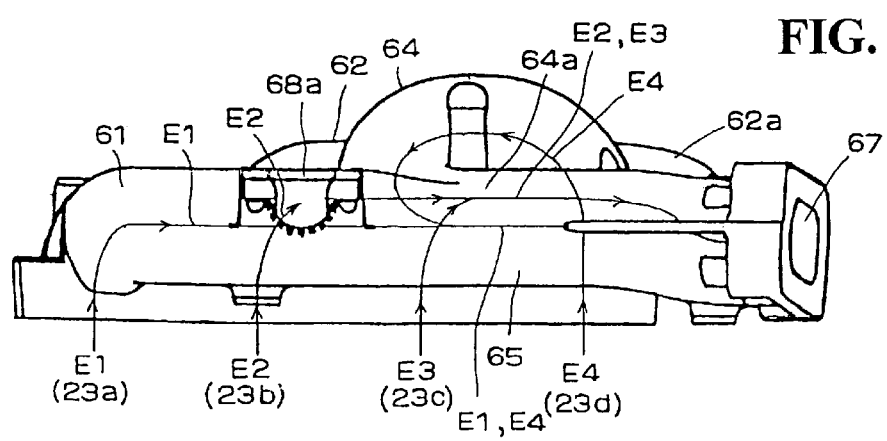

FIG. 9(a)
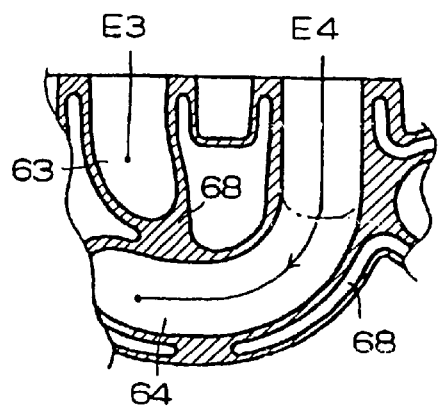
FIG. 9(b)
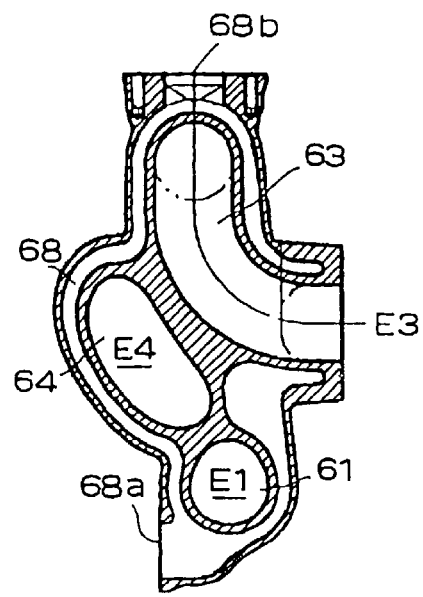
FIG. 9(c)
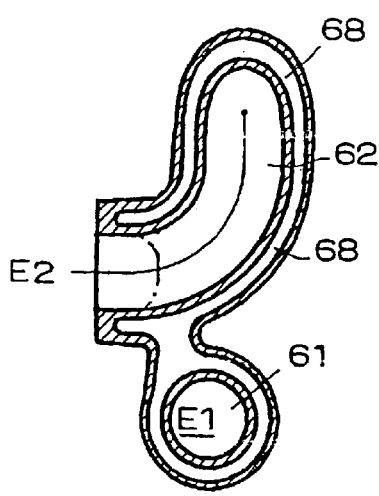
FIG. 9(d)
FIG. 9(e)
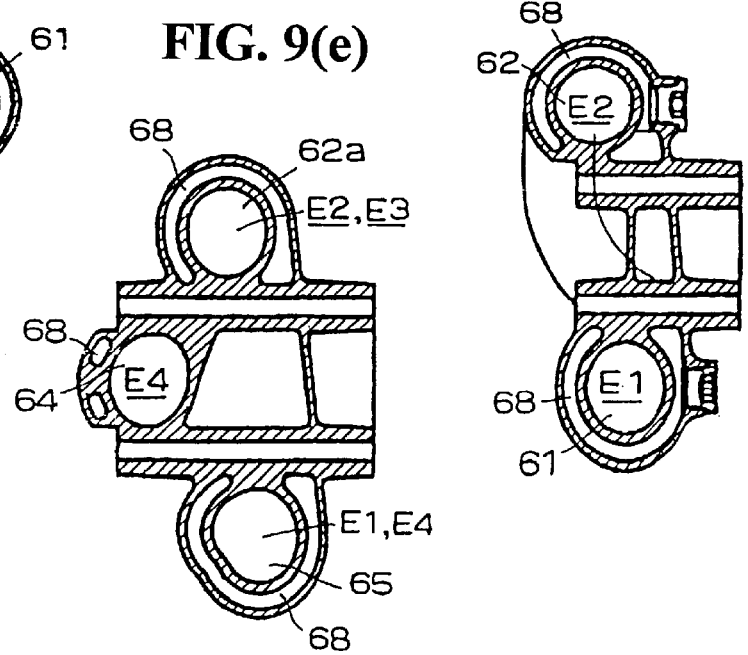

SMALL-SIZED BOAT

BACKGROUND OF THE INVENTION

1. Field of the Invention

The present invention relates a small-sized boat, principally to a small-sized boat of the saddle type. More particularly, the present invention relates to improvements in an exhaust manifold of a multiple cylinder engine carried on a small-sized boat.

2. Description of Background Art

Conventionally, a small-sized boat as shown in FIGS. 10(a) and 10(b) is known as a small-sized boat on which a multiple cylinder engine having an exhaust manifold on a side portion thereof is carried as set forth in the Official Gazette publication of Japanese Patent No. 2880680 FIG. 10(a) is a side elevational view, and FIG. 10(b) is a transverse sectional view as viewed from the rear.

The small-sized boat 1 includes a multiple cylinder engine 3 disposed in an internal space of a boat body 2 thereof such that a crankshaft of the multiple cylinder engine 3 extends along forward and rearward directions of the boat body 2.

As shown in FIG. 10(b) and FIG. 11(a), an exhaust manifold 4 is provided on a side portion of the multiple cylinder engine 3.

The exhaust manifold 4 is configured such that, as shown in FIG. 11(b), the lengths of exhaust pipes from connection openings 4a to exhaust ports of the engine 3 to exhaust gas exits at a rear location are substantially equal to one another. To make the lengths equal to one another, the exhaust pipes 4c have ducts which extend forwardly from the exhaust gas exits 4a once and then are curved such that they are directed to the exhaust gas exit 4b at the rear location.

The configuration just described can augment the output power of the engine 3 since the exhaust pipes 4c have no difference in length.

Since the exhaust manifold 4 of the engine 3 in the conventional small-sized boat described above is configured such that the ducts of the exhaust pipes 4c thereof extend forwardly from the exhaust gas exits 4a once they are curved such that they are directed to the exhaust gas exit 4b at the rear location, it has a disadvantage that the exhaust manifold 4 has a large overall size.

SUMMARY AND OBJECTS OF THE INVENTION

It is an object of the present invention to solve such a problem as just described and miniaturize an exhaust manifold of an engine to facilitate disposition of the engine in a boat body.

To attain the object described above, according to the present invention, a small-sized boat wherein a multiple cylinder engine having an exhaust manifold on a side portion thereof is disposed such that a crankshaft thereof extends along forward and rearward directions of a boat body and the exhaust manifold has a structure wherein exhaust pipes connected to exhaust ports of the engine are distributed upwardly and downwardly in such a manner as to form confluence pipes above and below the exhaust ports, and the confluence pipes are further joined to each other to form an exhaust gas exit from the exhaust manifold.

According to the present invention, a small-sized boat includes an exhaust gas exit that is disposed at a substantially central portion in a vertical direction of an internal space of the boat body, and an exhaust gas turbo charger is connected to the exhaust gas exit.

With the small-sized boat according to the present invention, since the multiple cylinder engine having the exhaust manifold on a side portion thereof is disposed such that the crankshaft thereof extends in the forward and rearward directions of the boat body and the exhaust manifold has a structure wherein the exhaust pipes connected to the exhaust ports of the engine are distributed upwardly and downwardly in such a manner as to form the confluence pipes above and below the exhaust ports and the confluence pipes are further joined to each other to form the exhaust gas exit from the exhaust manifold, the exhaust manifold can be miniaturized when compared with the conventional one (FIG. 11(b)).

Describing more particularly, each of the exhaust pipes 4c of the conventional exhaust manifold 4 shown in FIG. 11(b) is configured such that a duct extends forwardly from an exhaust gas exit 4a once and is then curved such that it is directed to the exhaust gas exit 4b at a rear location, and the exhaust pipes 4c are all joined together at the exhaust gas exit 4b. In other words, since the four exhaust pipes 4c are fully independent of each other until they come to the exhaust gas exit 4b, the exhaust manifold 4 cannot be avoided to have a large overall size.

In contrast, in the exhaust manifold in the multiple cylinder engine of the small-sized boat according to the present invention, the exhaust pipes connected to the exhaust ports of the engine are distributed upwardly and downwardly in such a manner as to form the confluence pipes above and below the exhaust ports and the confluence pipes are further joined to each other to form the exhaust gas exit from the exhaust manifold. In other words, since the exhaust pipes distributed upwardly and downwardly with respect to the exhaust ports of the engine are joined together in multiple stages, the exhaust manifold can be miniaturized when compared with the conventional one FIG. 11(b).

Accordingly, with the small-sized boat according to the present invention, the multiple cylinder engine having the exhaust manifold on a side portion thereof can be readily positioned in the boat body.

With the small-sized boat according to the present invention, since the exhaust gas turbo charger in the small-sized boat according to the present invention is connected to the exhaust gas exit, high output power can be obtained.

Further, the exhaust gas exit is disposed at a substantially central portion of the internal space of the boat body in the vertical direction and the exhaust gas turbo charger is connected to the exhaust gas exit. As a result, it is possible to position the exhaust gas turbo charger at a substantially central portion of the internal space of the boat body in the vertical direction, and besides the exhaust gas turbo charger can be readily positioned.

Accordingly, water entering the inside of the boat body is less liable to touch with the exhaust gas turbo charger, and the exhaust gas turbo charger is less likely to be damaged.

In other words, with the small-sized boat according to the present invention, since water entering the inside of the boat body is less liable to touch with the exhaust gas turbo charger while high output power can be obtained by the exhaust gas turbo charger, the exhaust gas turbo charger is less liable to be damaged.

Further scope of applicability of the present invention will become apparent from the detailed description given hereinafter. However, it should be understood that the detailed description and specific examples, while indicating preferred embodiments of the invention, are given by way of illustration only, since various changes and modifications

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 7(I) to 7(III) are views showing details of an exhaust manifold 60, and wherein FIG. 7(I) is a top plan view when FIG. 4 is the front, FIG. 7(II) is a partial cutaway front elevational view, and FIG. 7 (III) is a bottom plan view;

FIGS. 8(I) and 8(II) are views showing details of the exhaust manifold 60, and wherein FIG. 8(I) is a right side elevational view, and FIG. 8(II) is a rear elevational view;

FIG. 9($a$) is a sectional view taken along line a—a of FIG. 7(II),

FIG. 9($b$) is a sectional view taken along line b—b,

FIG. 9($c$) is a sectional view taken along line c—c,

FIG. 9($d$) is a sectional view taken along line d—d of FIG. 8(11), and FIG. 9($e$) is a sectional view taken along line e—e;

DETAILED DESCRIPTION OF THE PREFERRED EMBODIMENTS

Figure 1:
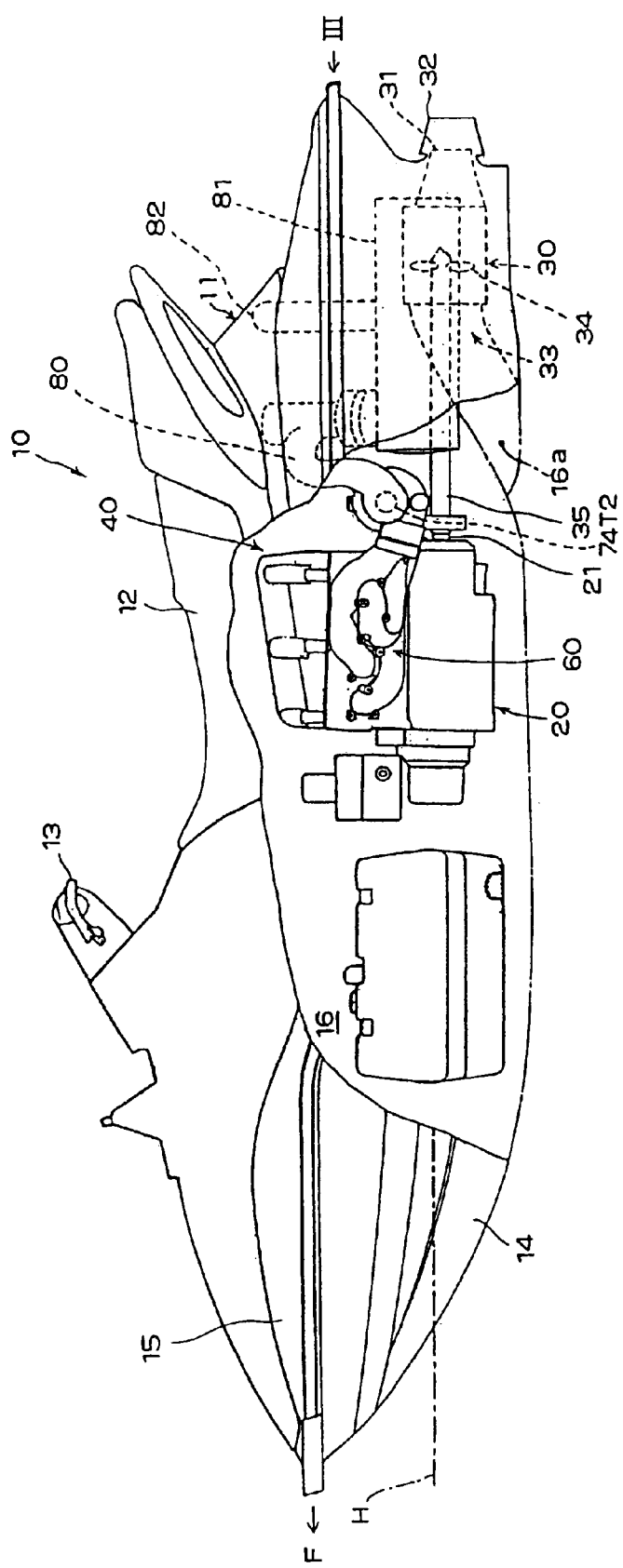
FIG. 1 is a schematic side elevational view, partly omitted, showing an embodiment of a small-sized boat according to the present invention.
Figure 2:
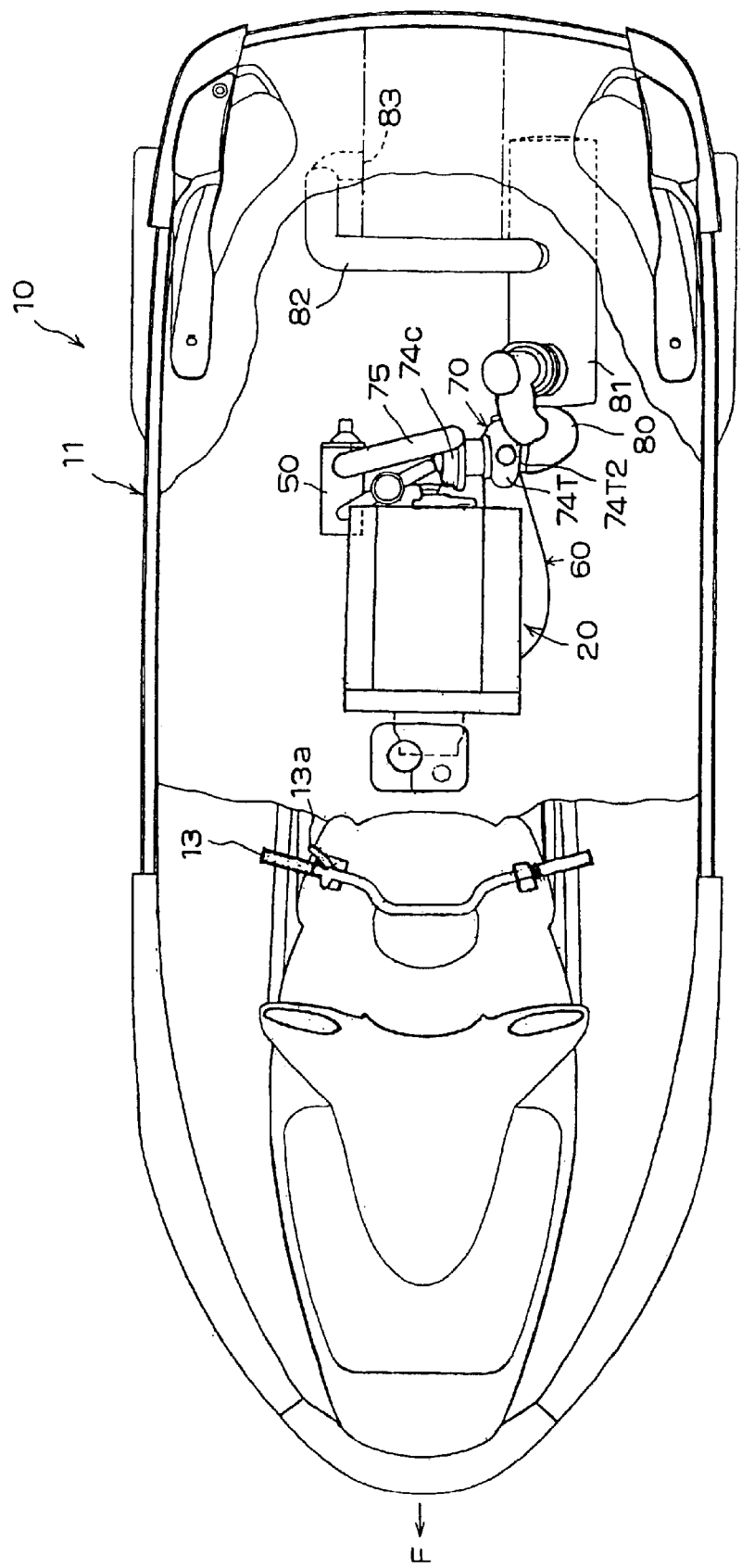
FIG. 2 is a top plan view of the small-sized boat.
Figure 3:
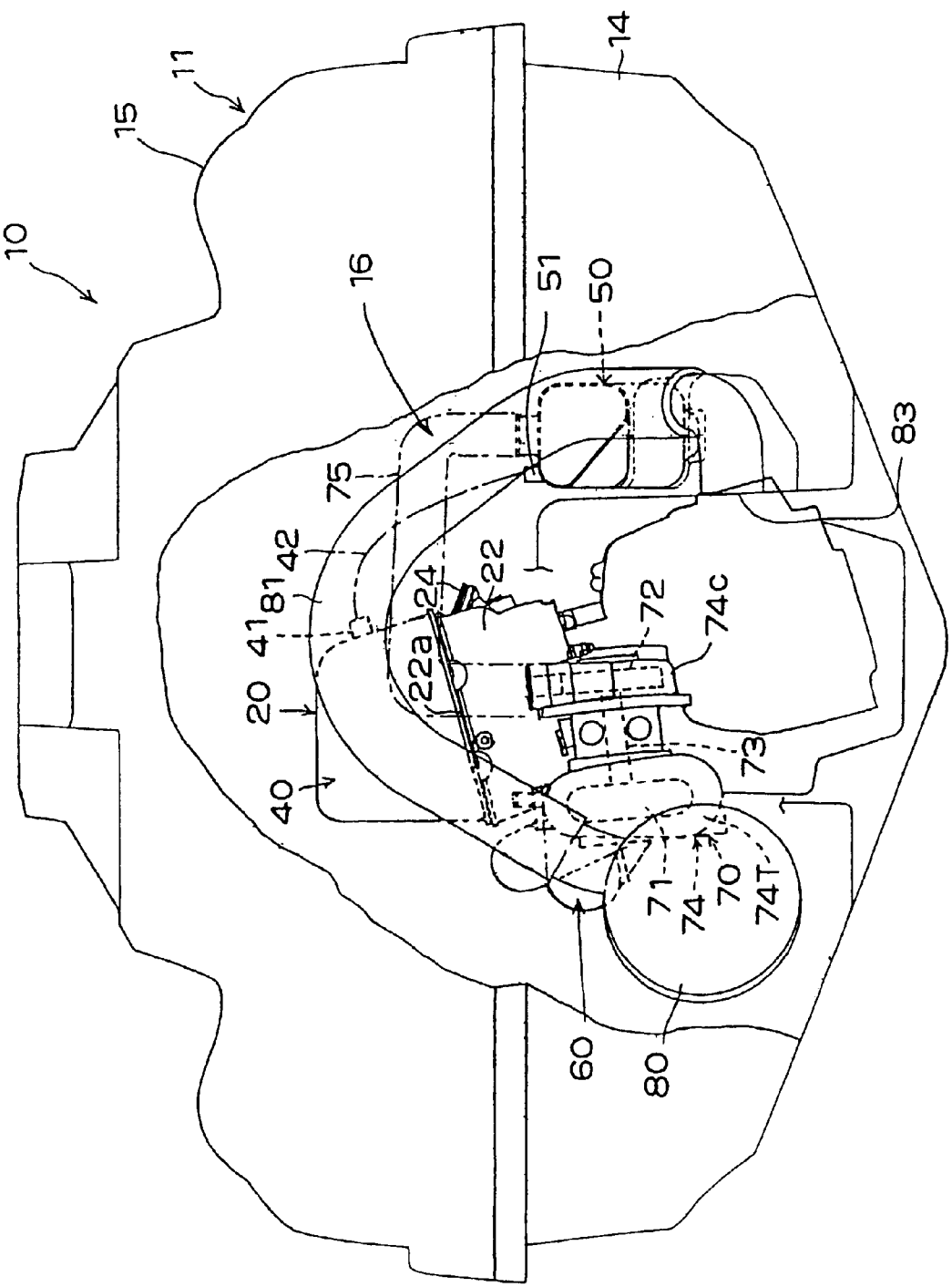
FIG. 3 is a schematic rear elevational view, partly omitted, of the small-sized boat (as viewed in a direction of an arrow mark III of FIG. 1)

In the following, an embodiment of the present invention is described with reference to the drawings. As shown in FIGS. 1 to 3 (principally in FIG. 1), the small-sized boat 10 of the present embodiment is a saddle type small-sized boat and can be steered by a steering handle bar 13 with a throttle lever gripped by a passenger seated on a seat 12 on a boat body 11.

The boat body 11 has a floating body structure wherein a lower hull panel 14 and upper hull panel 15 are joined together with a space 16 formed therebetween. In the space 16, an engine 20 is placed on the lower hull panel 14, and a jet pump 30 serving as propelling means driven by the engine 20 is provided at a rear portion of the lower hull panel 14.

Figure 4:
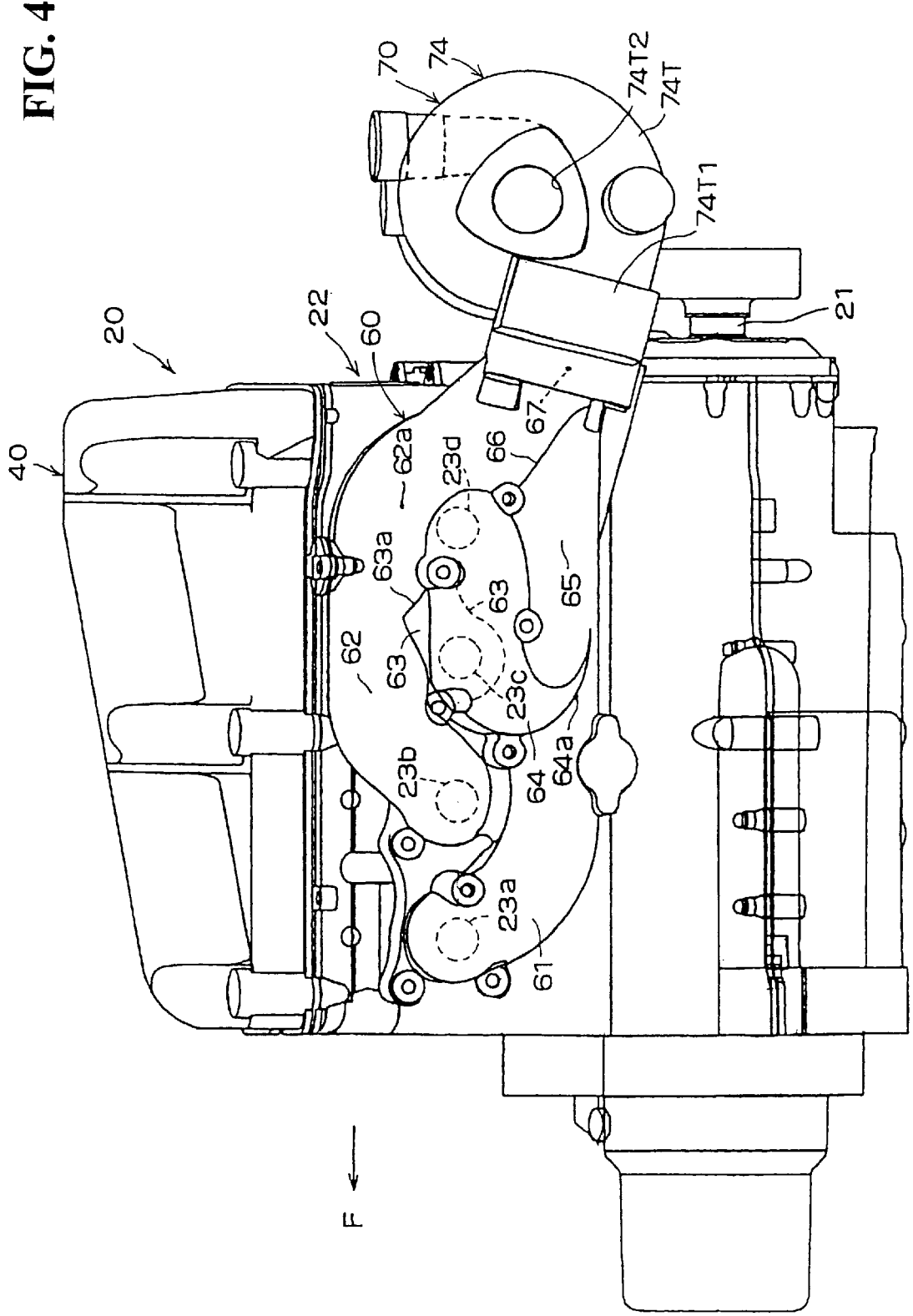
FIG. 4 is a schematic side elevational view of an engine 20.

The jet pump 30 has a flow path 33 extending from a intake 16$a$ opened to the bottom of the boat to a jet 31 opened to a rear end of the boat body and a nozzle 32, and an impeller 34 disposed in the flow path 33, and a shaft 35 of the impeller 34 is connected to an output power shaft 21 of the engine 20. Accordingly, if the impeller 34 is driven to rotate by the engine 20, then water taken in through the intake 16$a$ is jetted from the jet 31 past the nozzle 32, whereby the boat body 11 is propelled. The driving speed of the engine 20, that is, the propelling force by the jet pump 30, is controlled by a revolving operation of a throttle lever 13$a$ (refer to FIG. 2) of the steering handle bar 13 described above. The nozzle 32 is associated with the steering handle bar 13 by a control wire not shown and is controlled to be turned by an operation of the handle bar 13, whereby the advancing direction can be changed. FIG. 4 is a schematic side elevational view of the engine 20. The engine 20 is a DOHC straight four-cylinder four-cycle engine, and is disposed such that a crankshaft (refer to the output power shaft 21) thereof extends in forward and backward directions of the boat body 11.

As shown in FIGS. 1 to 6, an exhaust manifold 60 is provided on a side portion of the engine 20.

The exhaust manifold 60 is provided sidewardly of a cylinder block 22 and has a structure wherein exhaust pipes 61, 62, 63 and 64 connected to exhaust ports 23$a$, 23$b$, 23$c$ and 23$d$ of the engine 20 are distributed upwardly and downwardly in such a manner as to form confluence pipes 62$a$ and 65 above and below the exhaust ports 23$a$ to 23$d$ and the confluence pipes 62$a$ and 64 are further joined to each other to form an exhaust gas exit 67 from the exhaust manifold.

Referring to the FIGS. 7(I) to 9($e$), lines E1, E2, E3 and E4 with an arrow mark indicate exhaust gas paths corresponding to the exhaust ports 23$a$, 23$b$, 23$c$ and 23$d$ described above, respectively. Further, a water jacket 68, an entrance 68$a$ of cooling water, and an exit of cooling water 68$b$ are operatively provided. The entrance 68$a$ is connected to the downstream side of the jet pump 30 described above with respect to the impeller 34, and cooling water from the jet pump 30 is supplied thereto. The exit 68$b$ is connected to a cooling water entrance 76$a$ (refer to FIG. 5) of an exhaust gas turbo charger 70.

As shown in FIGS. 4 and 7 to 9, the exhaust manifold 60 has the first exhaust pipe 61 connected to the first exhaust port 23$a$ of the cylinder block 22, the second exhaust pipe 62 connected to the second exhaust port 23$b$, the third exhaust pipe 63 connected to the third exhaust port 23$c$, and the fourth exhaust pipe 64 connected to the fourth exhaust port 23$d$.

The second exhaust pipe 62 and the third exhaust pipe 63 extend upwardly and rearwardly from the second exhaust port 23$b$ and the third exhaust port 23$c$, respectively, and are curved such that they join together. The joining portion is denoted by reference character 63$a$ and form the confluence pipe 62$a$ which extends rearwardly.

Meanwhile, the first exhaust pipe 61 extends downwardly and rearwardly in a curved state from the first exhaust port 23$a$, and the fourth exhaust pipe 64 is curved forwardly once such that it extends above (this side in a direction perpendicular to the plane of FIG. 4) and across the third exhaust pipe 63 (refer to FIG. 9($a$)), and is further curved downwardly and rearwardly such that it joins to the first exhaust pipe 61 (the joining portion is denoted by reference character 64$a$) to form the confluence pipe 65 which extends rearwardly.

The confluence pipe 65 and the confluence pipe 62$a$ described above join together at a joining portion 66, and an exhaust port 67 for the entire exhaust manifold 60 is formed on the downstream side of the joining portion 66.

The exhaust gas exit 67 is disposed at a substantially central portion of the internal space 16 of the boat body 11 in the vertical direction.

Rearwardly of the exhaust manifold 60 having such a structure as described above, the exhaust gas turbo charger 70 which is driven to rotate by exhaust gas from the exhaust manifold 60 is provided.

The exhaust gas turbo charger 70 includes, as shown in FIG. 3, a turbine 71, a compressor 72, a shaft 73 which connects the turbine 71 and the compressor 72 to each other, and a casing 74.

The exhaust gas turbo charger 70 is disposed such that the shaft 73 thereof is directed in leftward and rightward directions of the boat body 11, and the turbine 71 is disposed adjacent to the exhaust manifold 60 and the compressor 72 is disposed adjacent to an intake port 24 of engine 20.

Figure 5:
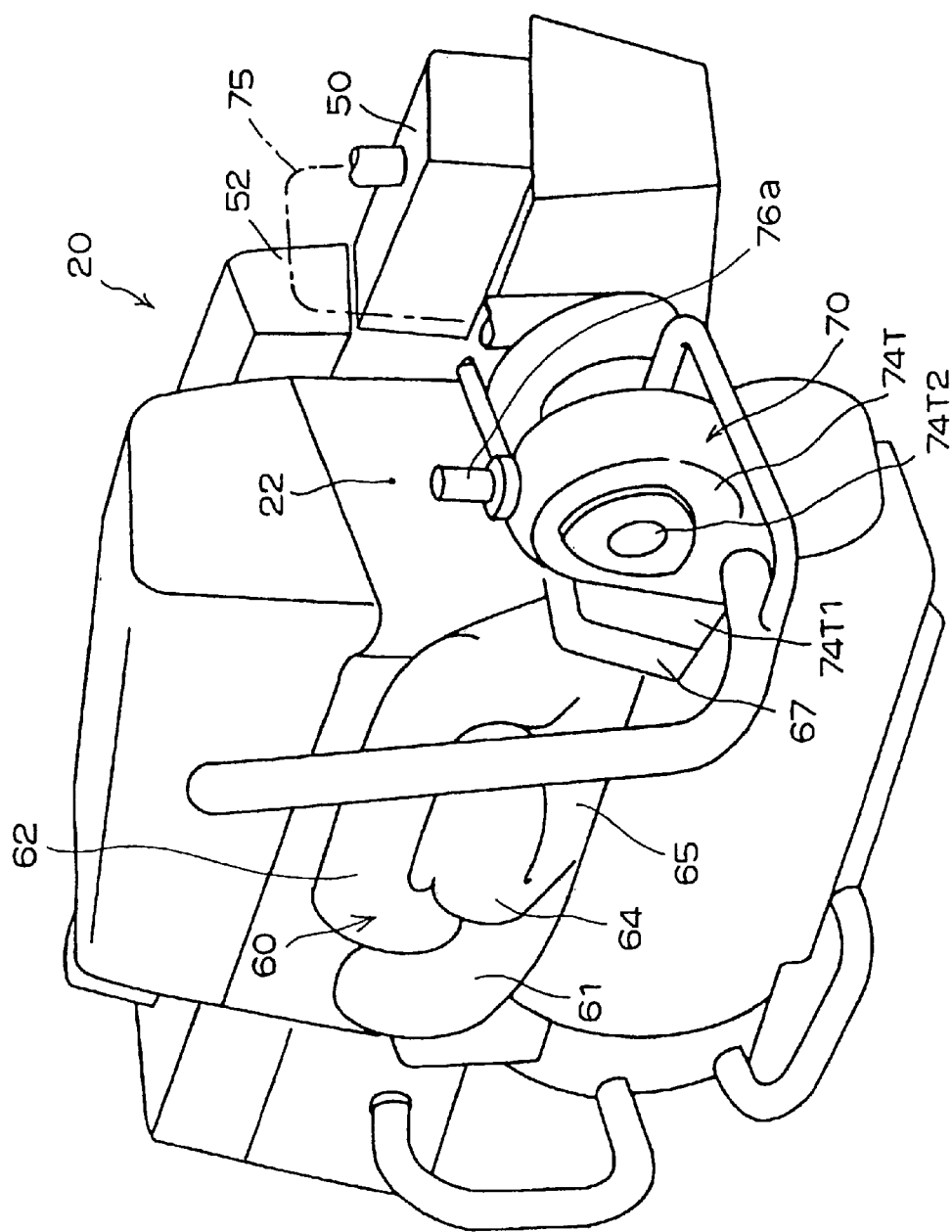
FIG. 5 is a schematic perspective view of the engine as viewed from obliquely rearwardly.

As shown in FIGS. 4 and 5, a turbine portion 74T of the casing 74 has formed therein a connection portion (exhaust gas inlet opening) 74T1 which is connected to the exhaust gas exit 67 of the exhaust manifold 60 and an exhaust port 74T2 through which exhaust gas which has rotated the turbine 71 is exhausted. A first exhaust pipe 80, a muffler 81 and a second exhaust pipe 82 are successively connected to the exhaust port 74T2 as shown in FIGS. 1 and 2, and an exhaust gas exit 83 (refer to FIG. 2) of the second exhaust pipe 82 is opened to the outside of the boat body 11 in the proximity of the jet pump 30 at a rear portion of the boat body 11 (refer to FIG. 3) such that exhaust gas is exhausted finally through the exhaust gas exit 83. In particular, the exhaust gas exit 83 for exhaust gas from the exhaust gas turbo charger 70 is to be exhausted to the outside of the boat body 11 is disposed rearwardly of the turbo charger 70.

As is apparent from FIGS. 4 and 5, the exhaust gas turbo charger 70 is provided rearwardly of and very close to the exhaust manifold 60 and is disposed rearwardly of and very close to the engine 20.

Figure 6:
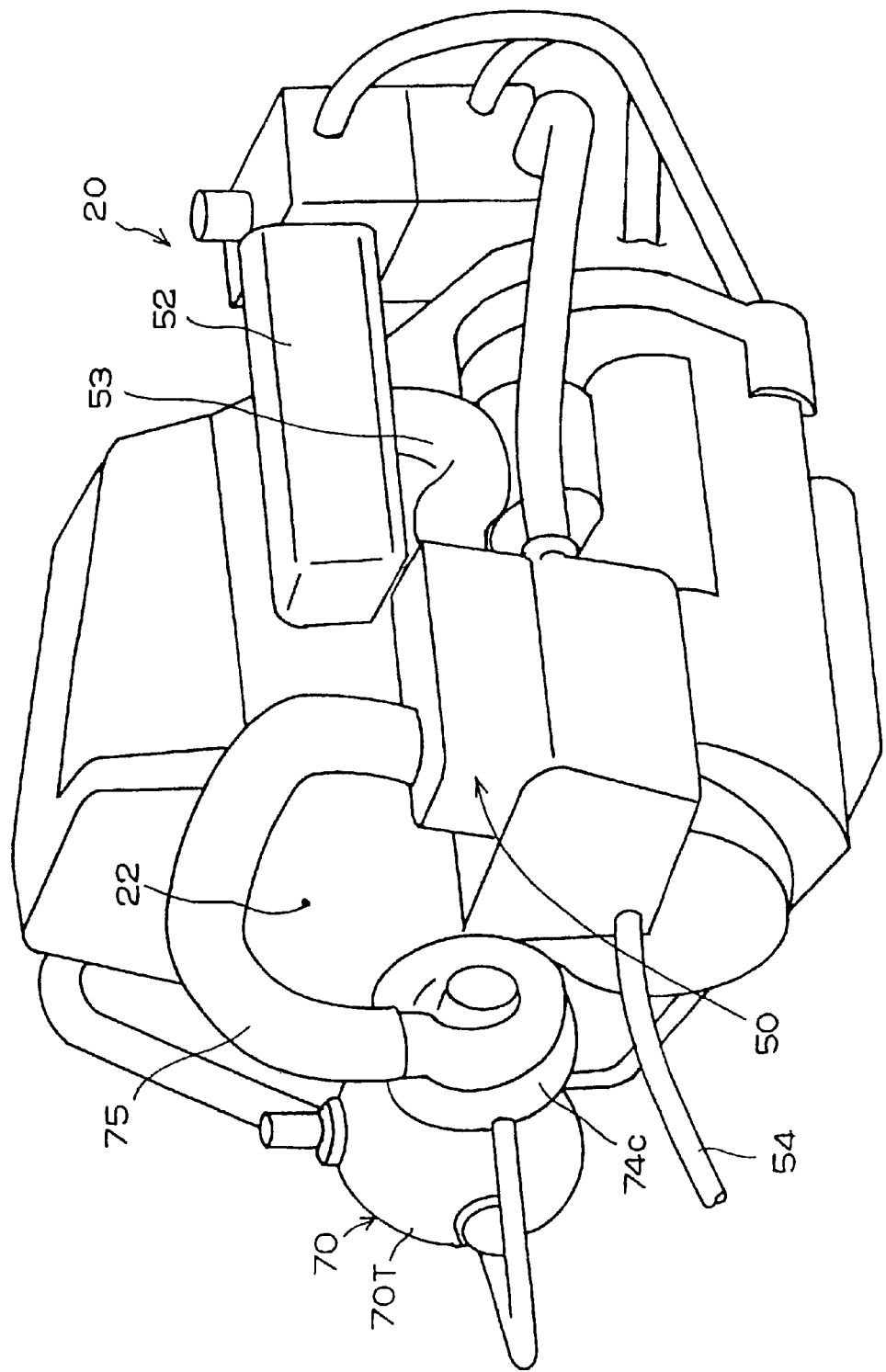
FIG. 6 is a schematic perspective view of the engine as viewed from obliquely rearwardly on the opposite side to that of FIG. 5.
Figure 7:
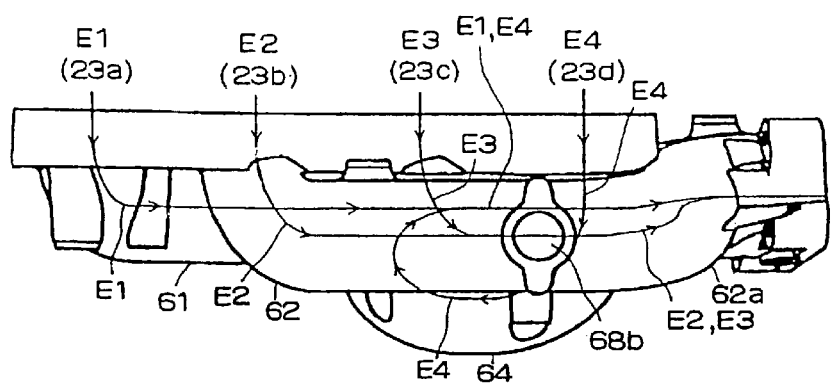
Figure 7:
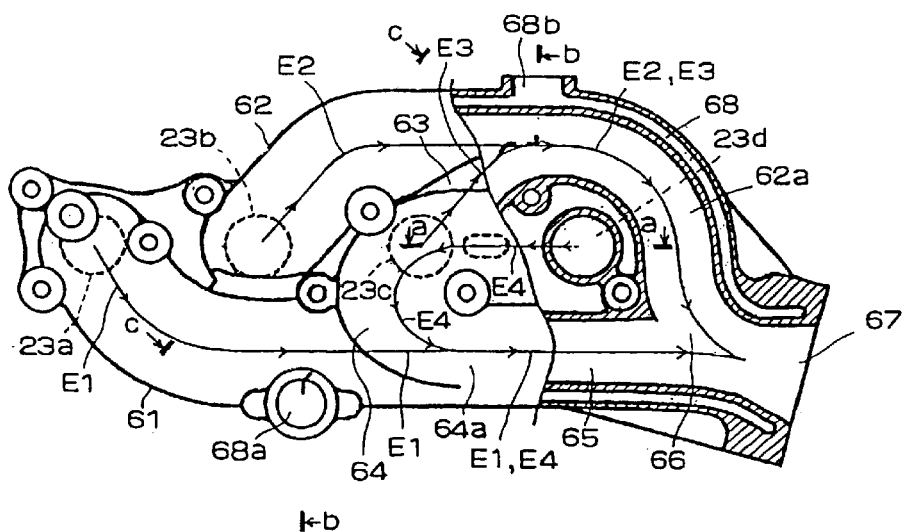
Figure 8:
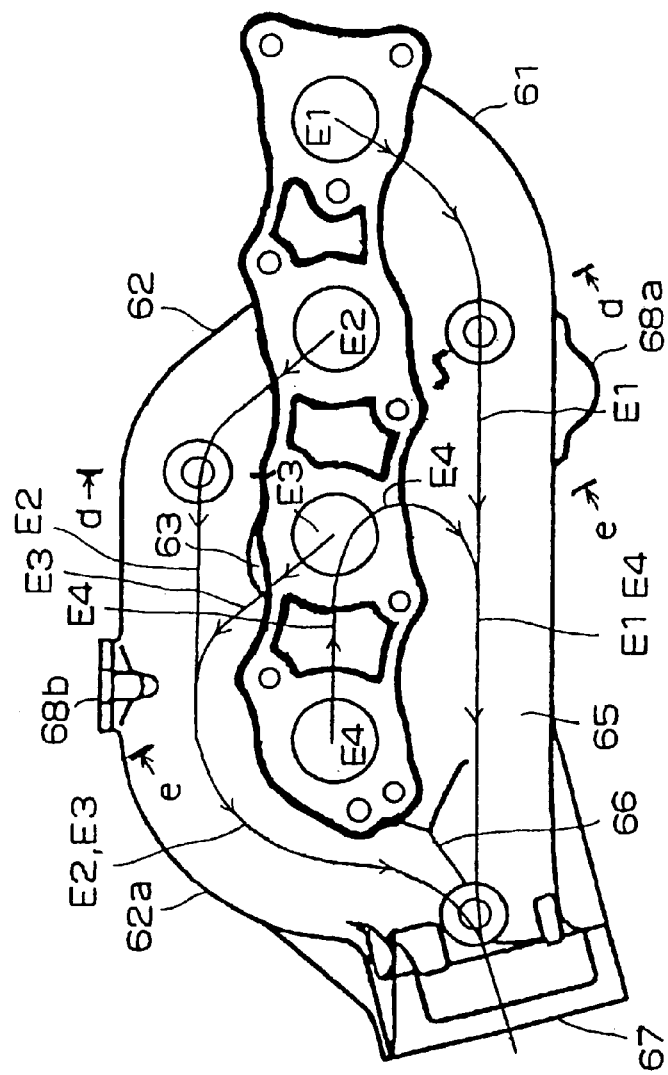
Figure 8I:
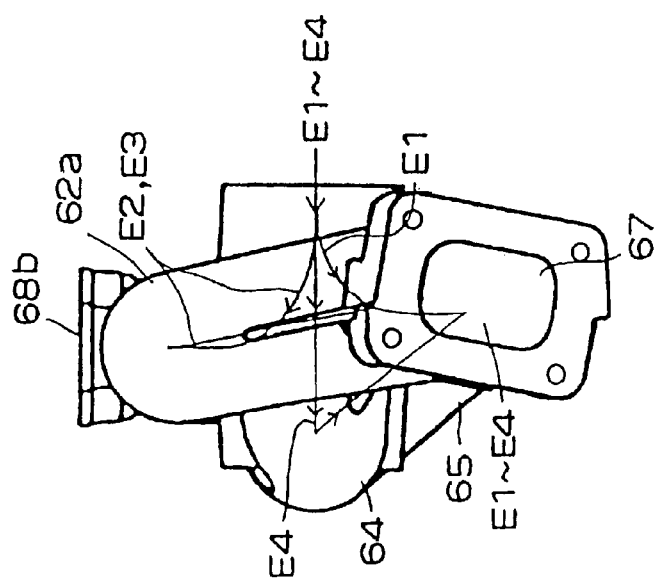
Figure 10A:
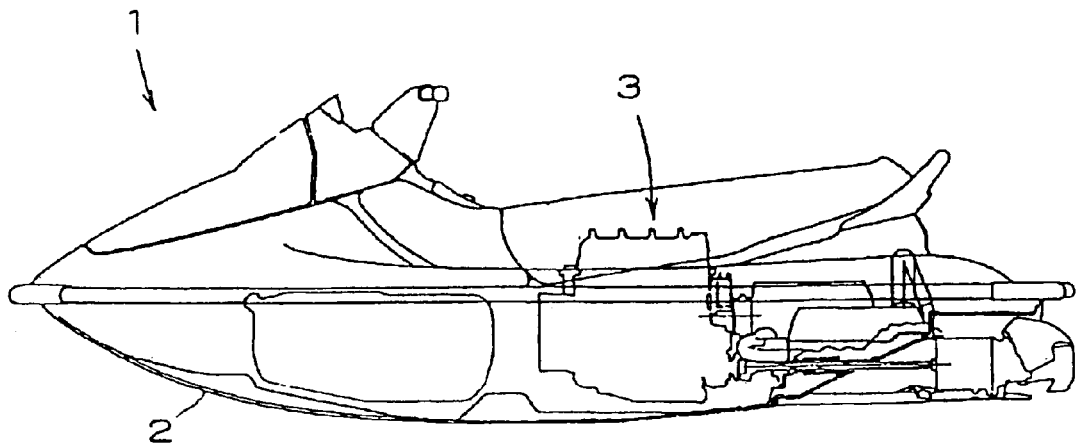
FIGS. 10($a$) and 10($b$) are explanatory views of the prior art.
Figure 10B:
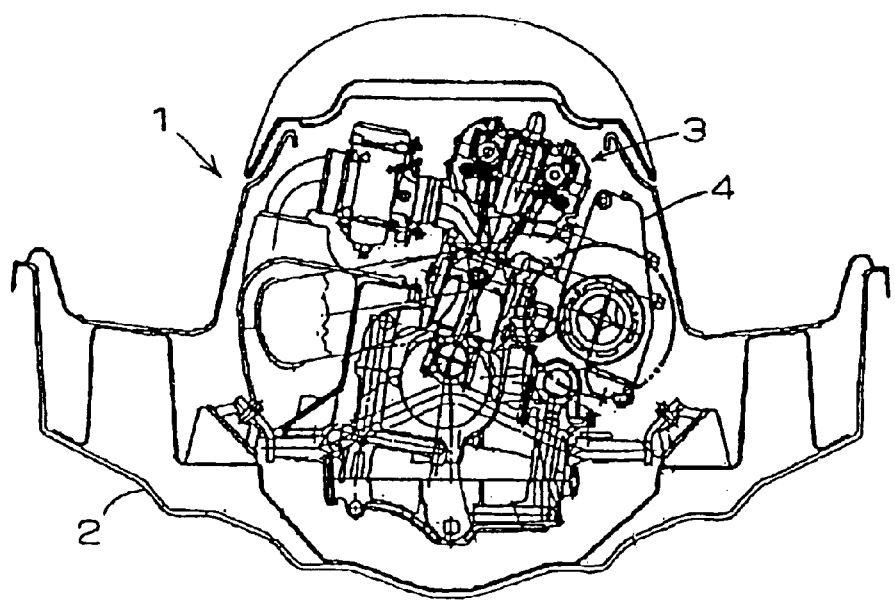

As shown in FIGS. 2, 3 and 6, an inter cooler 50 is connected to the compressor 72 (compressor portion 74C of the casing 74) of the exhaust gas turbo charger 70 through a pipe arrangement 75. The inter cooler 50 is provided sidewardly of the compressor 72.

As shown in FIG. 6, an intake chamber 52 provided sidewardly of the engine 20 is connected to the inter cooler 50 through a pipe arrangement 53 and connected to the intake port 24 (refer to FIG. 3) of the engine 20. The inter cooler 50 is disposed below the intake chamber 52.

It is to be noted that, in FIG. 6, a cooling water hose 54 is connected to the inter cooler 50. In addition, a head cover 40 includes a breather exit 41. The breather exit 41 is connected to the inter cooler 50 through a breather pipe 42.

With the small-sized boat having such a structure as described above, the following operation and effects are obtained. Since the multiple cylinder engine 20 having the exhaust manifold 60 on a side portion thereof is disposed such that the crankshaft 21 thereof extends in the forward and rearward directions of the boat body 11 and the exhaust manifold 60 has a structure wherein the exhaust pipes 61 to 64 connected to the exhaust ports 23a to 23d of the engine 20 are distributed upwardly and downwardly in such a manner as to form the confluence pipes 62a and 64 above and below the exhaust ports 23a to 23d and the confluence pipes 62a and 64 are further joined to each other to form the exhaust gas exit 67 from the exhaust manifold, the exhaust manifold can be miniaturized when compared with the conventional one (FIG. 11(b)).

Figure 11A:
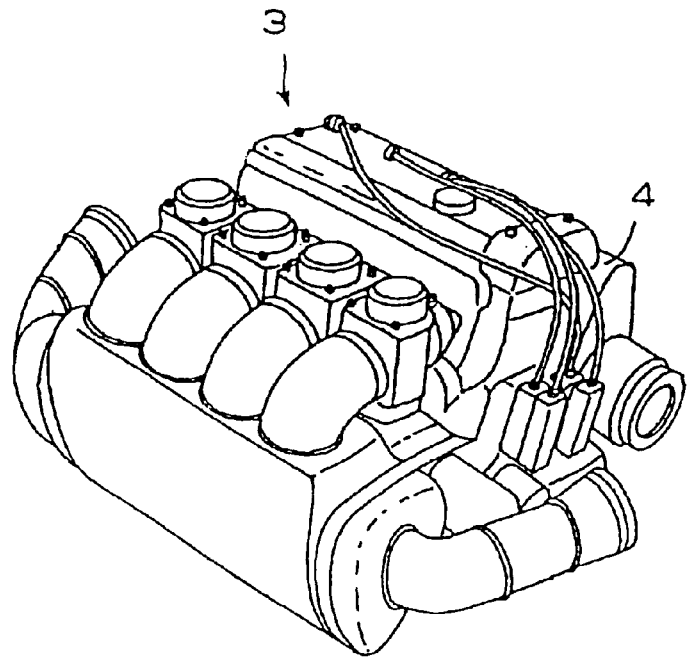
FIGS. 11($a$) and 11($b$) are explanatory views of the prior art.
Figure 11B:
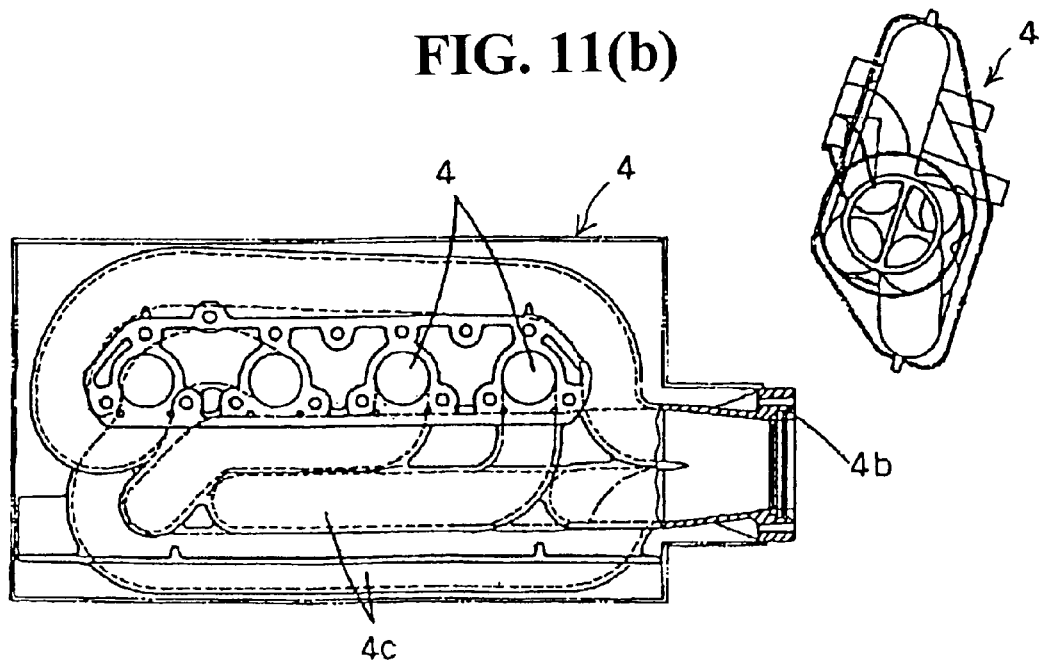

Describing more particularly, each of the exhaust pipes 4c of the conventional exhaust manifold 4 shown in FIG. 11(b) is configured such that a duct extends forwardly from an exhaust gas exit 4a once and is then curved such that it is directed to the exhaust gas exit 4b at a rear location, and the exhaust pipes 4c are all joined together at the exhaust gas exit 4b. In other words, since the four exhaust pipes 4c are fully independent of each other until they come to the exhaust gas exit 4b, the exhaust manifold 4 cannot be avoided to have a large overall size.

In contrast, in the exhaust manifold 60 in the present embodiment, the exhaust pipes 61 to 64 connected to the exhaust ports 23a to 23d of the engine 20 are distributed upwardly and downwardly in such a manner as to form the confluence pipes 62a and 64 above and below the exhaust ports 23a to 23d and the confluence pipes 62a and 64 are further joined to each other to form the exhaust gas exit 67 from the exhaust manifold. In other words, since the exhaust pipes 61 to 64 distributed upwardly and downwardly with respect to the exhaust ports 23a to 23d of the engine are joined together in multiple stages, the exhaust manifold can be miniaturized as compared with the conventional one (FIG. 11 (b)).

Accordingly, with the small-sized boat, the engine 20 having the exhaust manifold on a side portion thereof can be readily disposed in the boat body 11.

Since the exhaust gas turbo charger 70 is connected to the exhaust gas exit 67 of the exhaust manifold 60, high output power can be obtained.

Further, the exhaust gas exit 67 is disposed at a substantially central portion of the internal space 16 of the boat body 11 in the vertical direction and the exhaust gas turbo charger 70 is connected to the exhaust gas exit 67. As a result, it is possible to dispose the exhaust gas turbo charger 70 at a substantially central portion of the internal space 16 of the boat body 11 in the vertical direction as shown in FIG. 1, and besides the exhaust gas turbo charger 70 can be readily positioned.

Accordingly, water entering the inside of the boat body 11 is less liable to touch with the exhaust gas turbo charger 70, and the exhaust gas turbo charger 70 is less likely to be damaged.

In other words, with the small-sized boat, since water entering the inside of the boat body 11 is less liable to touch with the exhaust gas turbo charger 70 while high output power can be obtained by the exhaust gas turbo charger 70, the exhaust gas turbo charger 70 is less liable to be damaged.

The confluence pipe 62a of the second exhaust pipe 62 and the third exhaust pipe 63 is curved by a greater amount than the confluence pipe 65 of the first exhaust pipe and the fourth exhaust pipe 64 and the fourth exhaust pipe 64 is curved forwardly once such that it extends across the third exhaust pipe 63 and is then curved downwardly and rearwardly. The pipe lengths of the exhaust pipes 61 to 64, that is, the lengths of the exhaust gas paths E1 to E4, become substantially equal to one another. Accordingly, higher output power can be obtained.

The exhaust gas turbo charger 70 which is driven to rotate by exhaust gas from the exhaust manifold 60 of the engine 20 is provided rearwardly of the exhaust manifold 60, a sufficient supercharging effect can be obtained.

Further, since the engine 20 is disposed such that the crankshaft 21 thereof extends in the forward and rearward directions of the boat body 11 and the exhaust gas turbo charger 70 is provided rearwardly of the exhaust manifold 60, the exhaust gas turbo charger 70 can be provided without suffering from damage to the weight balance of the boat 10 very much.

In other words, an effect that the weight balance of the boat 10 can be maintained while the exhaust gas turbo charger 70 is provided.

Since the exhaust gas exit 83 for exhaust gas which has come out of the turbo charger 70 and is to be exhausted to the outside of the boat body 11 is disposed rearwardly of the exhaust gas turbo charger 70, laying or disposition of members of an exhaust system such as an exhaust pipe (in the present embodiment, the first exhaust pipe 80, muffler 81 and second exhaust pipe 82) can be performed readily.

Since the exhaust gas turbo charger 70 is provided rearwardly of and very close to the exhaust manifold 60, the exhaust gas turbo charger 70 is driven efficiently, and as a result, a more sufficient supercharging effect can be obtained.

Besides, since the exhaust gas turbo charger 70 is provided rearwardly of and very close to the exhaust manifold 60, the weight balance is maintained (concentration of the weight is achieved), and the steering performance of the boat body is not damaged although the turbo charger 70 is provided.

Since the exhaust gas turbo charger 70 is provided rearwardly of and very close to the engine 20, the weight balance is kept well (concentration of the weight is achieved), and the steering performance of the boat body 11 is not damaged although the turbo charger 70 is provided.

Since the exhaust gas turbo charger 70 is disposed such that the shaft 73 which connects the turbine 71 and the compressor 72 thereof to each other is directed in the leftward and rightward directions of the boat body 11, the exhaust gas turbo charger 70 can be disposed more closely to the engine 20. Accordingly, it is possible to maintained the weight balance (to achieve concentration of the weight), and as a result, the steering performance of the boat body can be maintained although the turbo charger 70 is provided.

Besides, since the turbine 71 of the turbo charger 70 is disposed adjacent to the exhaust manifold 60 and the compressor 72 is disposed adjacent to the intake port 24 of the engine 20, connection between the exhaust gas turbo charger 70 and the engine 20 can be performed readily.

Particularly, the connection between the exhaust manifold 60 and the exhaust gas turbo charger 70 and the connection between the exhaust gas turbo charger 70 and the inter cooler 50 and intake chamber 52 are facilitated.

Since the inter cooler 50 is connected to the compressor of the exhaust gas turbo charger 70, the supercharging efficiency of the exhaust gas turbo charger 70 is augmented. In addition, since the inter cooler 50 is provided sidewardly of the compressor 72, the weight balance can be maintained (concentration of the weight is achieved), and as a result, the steering performance of the boat body 11 can be maintained although the turbo charger 70 and the inter cooler 50 are provided.

Since the inter cooler 50 is disposed below the intake chamber 52 which follows the inter cooler 50 and is provided sidewardly of the engine, even if water should enter the turbo charger 70, the water is less likely to be admitted into the body of the engine 20. Accordingly, the engine body is less likely to be damaged. The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A small-sized boat wherein a multiple cylinder engine having an exhaust manifold on a side portion thereof is disposed such that a crankshaft thereof extends along forward and rearward directions of a boat body, comprising:

said exhaust manifold has a structure wherein exhaust pipes connected to exhaust ports of said engine are distributed upwardly and downwardly in such a manner as to form confluence pipes above and below said exhaust ports; and said confluence pipes are further joined to each other to form an exhaust gas exit from said exhaust manifold.

2. The small-sized boat according to claim 1, wherein said exhaust gas exit is disposed at a substantially central portion in a vertical direction of an internal space of said boat body, and an exhaust gas turbo charger is connected to said exhaust gas exit.

3. The small-sized boat according to claim 1, wherein a first exhaust pipe extends from a first exhaust port in a downward direction to extend to said exhaust manifold.

4. The small-sized boat according to claim 3, wherein a second exhaust pipe extends from a second exhaust port in an upward direction to extend to said exhaust manifold.

5. The small-sized boat according to claim 4, wherein a third exhaust pipe extends from a third exhaust port in a downward direction to extend to said exhaust manifold.

6. The small-sized boat according to claim 5, wherein a fourth exhaust pipe extends from a fourth exhaust port in a downward direction to extend to said exhaust manifold.

7. The small-sized boat according to claim 6, wherein said third and fourth exhaust pipes are connected together to form a single pipe extending to said exhaust manifold.

8. The small-sized boat according to claim 6, wherein said first, third and fourth exhaust pipes are connected together to form a single pipe extending to said exhaust manifold.

9. A small-sized boat comprising:

a multiple cylinder engine operatively connect to said small-sized boat;

an exhaust manifold positioned on a side portion of said multiple cylinder engine;

said exhaust manifold includes a plurality of exhaust pipes connected to exhaust ports of said engine, said plurality of exhaust pipes are distributed upwardly and downwardly to form confluence pipes above and below said exhaust ports; and said confluence pipes are further joined to each other to form an exhaust gas exit from said exhaust manifold.

10. The small-sized boat according to claim 9, wherein said exhaust gas exit is disposed at a substantially central portion in a vertical direction of an internal space of said boat body, and an exhaust gas turbo charger is connected to said exhaust gas exit.

11. The small-sized boat according to claim 9, wherein a first exhaust pipe extends from a first exhaust port in a downward direction to extend to said exhaust manifold.

12. The small-sized boat according to claim 11, wherein a second exhaust pipe extends from a second exhaust port in an upward direction to extend to said exhaust manifold.

13. The small-sized boat according to claim 12, wherein a third exhaust pipe extends from a third exhaust port in a downward direction to extend to said exhaust manifold.

14. The small-sized boat according to claim 13, wherein a fourth exhaust pipe extends from a fourth exhaust port in a downward direction to extend to said exhaust manifold.

15. The small-sized boat according to claim 14, wherein said third and fourth exhaust pipes are connected together to form a single pipe extending to said exhaust manifold.

16. The small-sized boat according to claim 14, wherein said first, third and fourth exhaust pipes are connected together to form a single pipe extending to said exhaust manifold.

* * * * *